(12) United States Patent
Janardhanan (10) Patent No.: US 6,985,727 B2
(45) Date of Patent: Jan. 10, 2006

(54) METHOD AND APPARATUS FOR OPTIMIZING SEARCH RATE AND FINGER ASSIGNMENT RATE

(75) Inventor: Kodiswaran Babu Janardhanan, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 268 days.

(21) Appl. No.: 10/243,389

(22) Filed: Sep. 12, 2002

(65) Prior Publication Data

US 2004/0053612 A1 Mar. 18, 2004

(51) Int. Cl.
*H04Q 7/20* (2006.01)

(52) U.S. Cl. .................. 455/434; 455/441; 375/347; 375/349

(58) Field of Classification Search ............... 455/146, 455/238.1, 272, 434, 441; 375/130, 144, 375/147, 148, 347, 349; 702/142; 370/335, 370/342, 441, 479
See application file for complete search history.

(56) References Cited

U.S. PATENT DOCUMENTS

| | | | | |
|---|---|---|---|---|
| 5,490,165 A | | 2/1996 | Blakeney, II et al. | |
| 5,881,058 A | * | 3/1999 | Chen | 370/335 |
| 5,903,596 A | * | 5/1999 | Nakano | 375/150 |
| 6,078,611 A | * | 6/2000 | La Rosa et al. | 375/147 |
| 6,157,820 A | * | 12/2000 | Sourour et al. | 455/226.2 |
| 6,292,660 B1 | * | 9/2001 | Hartless et al. | 455/434 |
| 6,320,849 B1 | | 11/2001 | Hughes et al. | |
| 6,370,183 B1 | * | 4/2002 | Newson et al. | 375/144 |
| 6,373,882 B1 | * | 4/2002 | Atarius et al. | 375/148 |
| 6,408,039 B1 | * | 6/2002 | Ito | 375/347 |
| 6,426,960 B2 | | 7/2002 | Antonio | |
| 6,553,059 B1 | * | 4/2003 | Ito | 375/150 |
| 6,658,045 B1 | * | 12/2003 | Jin | 375/147 |
| 6,668,172 B1 | * | 12/2003 | Yoshimura | 455/441 |
| 6,718,170 B1 | * | 4/2004 | Hughes | 455/450 |
| 6,725,016 B1 | * | 4/2004 | Jeong et al. | 455/65 |
| 2002/0094836 A1 | * | 7/2002 | Nakamura et al. | 455/522 |

FOREIGN PATENT DOCUMENTS

| | | |
|---|---|---|
| EP | 1041725 | 10/2000 |
| EP | 1096711 | 5/2001 |

* cited by examiner

*Primary Examiner*—William Trost
(74) *Attorney, Agent, or Firm*—Philip Wadsworth; Sandra L. Godsey; Albert J. Harnois (57) ABSTRACT

Systems and techniques for optimizing search rate and finger assignment rate when fading is varying in order to obtain an optimum solution between better system capacity and processor utilization. A maximum search rate and finger assignment rate are used when the mobile station is moving at a slow velocity.

16 Claims, 7 Drawing Sheets

(PRIOR ART)

METHOD AND APPARATUS FOR OPTIMIZING SEARCH RATE AND FINGER ASSIGNMENT RATE

BACKGROUND

1. Field

The disclosed embodiments relate generally to the field of communications, and more specifically to methods and apparatus for optimizing search rate and finger assignment rate in a wireless communication system capable of receiving multiple signals.

2. Background

The field of communications has many applications including, e.g., paging, wireless local loops, Internet telephony, and satellite communication systems. An exemplary application is a cellular telephone system for mobile subscribers. (As used herein, the term "cellular" system encompasses both cellular and Personal Communications Services (PCS) system frequencies.) Modern communication systems designed to allow multiple users to access a common communications medium have been developed for such cellular systems. These modern communication systems may be based on Code Division Multiple Access (CDMA), Time Division-Multiple Access (TDMA), Frequency Division-Multiple access (FDMA), Space Division-Multiple Access (SDMA), Polarization Division-Multiple Access (PDMA), or other modulation techniques known in the art. These modulation techniques demodulate signals received from multiple users of a communication system, thereby enabling an increase in the capacity of the communication system. In connection therewith, various wireless systems have been established including, e.g., Advanced Mobile Phone Service (AMPS), Global System for Mobile communication (GSM), and some other wireless systems.

In FDMA systems, the total frequency spectrum is divided into a number of smaller sub-bands and each user is given its own sub-band to access the communication medium. Alternatively, in TDMA systems, each user is given the entire frequency spectrum during periodically recurring time slots. A CDMA system provides potential advantages over other types of systems, including increased system capacity. In CDMA systems, each user is given the entire frequency spectrum for all of the time, but distinguishes its transmission through the use of a unique code.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) some other standards.

In the above named CDMA communication systems and standards, the available spectrum is shared simultaneously among a number of users, and techniques such as soft handoff are employed to maintain sufficient quality to support delay-sensitive services, such as voice. Data services are also available. More recently, systems have been proposed that enhance the capacity for data services by using higher order modulation, very fast feedback of Carrier-to-Interference ratio (C/I) from a mobile station, very fast scheduling, and scheduling for services that have more relaxed delay requirements. An example of such a data-only communication system using these techniques, is the High Data Rate (HDR) system that conforms to the TIA/EIA/IS-856 standard (the IS-856 standard).

In contrast to the other above named standards, an IS-856 system uses the entire spectrum available in each cell to transmit data to a single user at one time. One factor used in determining which user is served is link quality. By using link quality as a factor for selecting which user is served, the system spends a greater percentage of time sending data at higher rates when the channel is good, and thereby avoids committing resources to support transmission at inefficient rates. The net effect is higher data capacity, higher peak data rates, and higher average throughput.

Systems can incorporate support for delay-sensitive data, such as voice channels or data channels supported in the IS-2000 standard, along with support for packet data services such as those described in the IS-856 standard. One such system is described in a proposal submitted by LG Electronics, LSI Logic, Lucent Technologies, Nortel Networks, QUALCOMM Incorporated, and Samsung to the 3rd Generation Partnership Project 2 (3GPP2). The proposal is detailed in documents entitled "Updated Joint Physical Layer Proposal for 1xEV-DV", submitted to 3GPP2 as document number C50-20010611-009, Jun. 11, 2001; "Results of L3NQS Simulation Study", submitted to 3GPP2 as document number C50-20010820-011, Aug. 20, 2001; and "System Simulation Results for the L3NQS Framework Proposal for cdma2000 1x-EVDV", submitted to 3GPP2 as document number C50-20010820-012, Aug. 20, 2001. These are hereinafter referred to as the 1xEV-DV proposal.

Figure 1:
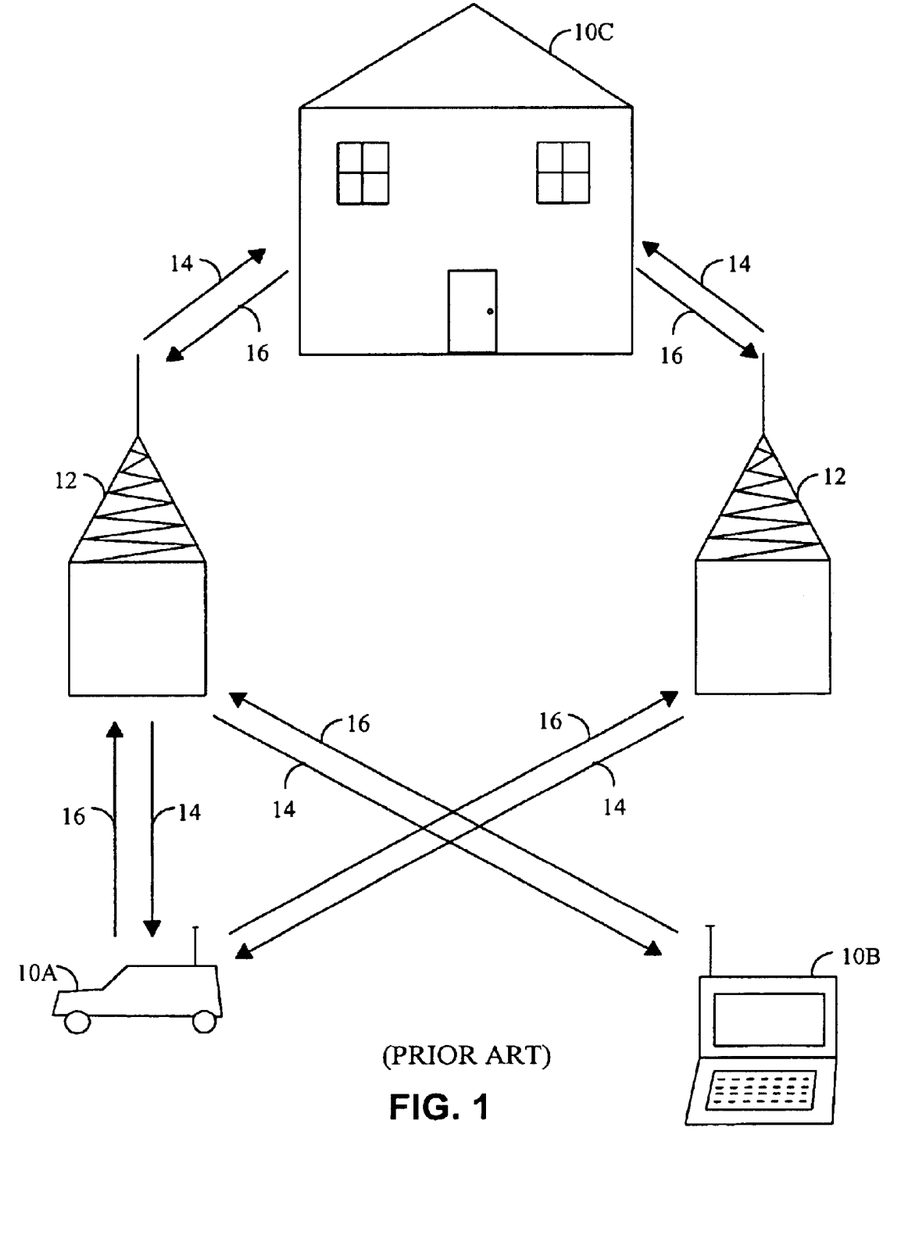
FIG. 1 an embodiment of a wireless communication system with three mobile stations and two base stations.

A wireless communication system may comprise multiple mobile stations and multiple base stations. FIG. 1 exemplifies an embodiment of a wireless communication system with three mobile stations 10A, 10B and 10C and two base stations 12. In FIG. 1, the three mobile stations are shown as a mobile telephone unit installed in a car 10A, a portable computer remote 10B, and a fixed location unit 10C such as might be found in a wireless local loop or meter reading system. Mobile stations may be any type of communication unit such as, for example, hand-held personal communication system units, portable data units such as a personal data assistant, or fixed location data units such as meter reading equipment. FIG. 1 shows a forward link 14 from the base station 12 to the mobile stations 10 and a reverse link 16 from the mobile stations 10 to the base stations 12.

A radio receiver operates in a relatively hostile environment. A radio signal propagating from a transmitter to a corresponding receiver is subjected to scattering and reflections by objects and structures surrounding the transmitter and receiver. Structures, such a buildings, and surrounding terrain, such as walls and hillsides, contribute to the scattering and reflection of the transmitted signal. The scattering and reflection of the transmit signal results in multiple signal paths from the transmitter to the receiver. The objects that contribute to the multiple signal paths are centered about the receiver in a radius that is proportional to the receive signal wavelength. The contributors to the multiple signal paths change as the receiver moves.

A searcher element of the radio receiver scans received signals for multipath signals and assigns the multipath signals that meet a threshold to demodulation elements (also called fingers). The rate at which the searcher element scans for the received signals is the searcher rate and the rate at which the fingers are assigned multipath signals is the Finger Assignment Rate (FAR).

Increasing the searcher rate or the FAR may increase signal gain; however, doing so has a cost. It also increases utilization of a processor, which can take away from the processor being utilized for other tasks. It would be useful to increase the searcher rate and the FAR only when signal gain is needed. Signal gain is needed when there is fading in the multipath signals when the relative velocity between a transmitting device and a receiving device is slow. Thus, there is a need in the art for an apparatus and method that optimizes the search rate and finger assignment rate based on fading of multipath signals when the relative velocity is slow.

SUMMARY

Embodiments disclosed herein address the need for a feature that optimizes search rate and finger assignment rate in a wireless communication system capable of receiving multiple signals.

The disclosed embodiments provide methods and system elements that implement various aspects of the invention, as described in further detail below.

Embodiments disclosed herein addresses the above stated needs by providing a method and apparatus for optimizing search rate and finger assignment rate. In one aspect, a method and apparatus of wireless communications comprises detecting when a mobile station is moving at a slow velocity and increasing a searching rate responsive to detecting when the mobile station is moving at a slow velocity. In another aspect, a method and apparatus of wireless communications further comprises increasing a finger assignment rate responsive to detecting when the mobile station is moving at a slow velocity. In one aspect, a method and apparatus of wireless communications further comprises increasing the searching rate to a maximum searching rate. In another aspect, a method and apparatus of wireless communications further comprises increasing the finger assignment rate to a maximum finger assignment rate. In yet another aspect, a method and apparatus of wireless communications increases the searching rate only when a number of assignable multipath signals is greater than number of fingers available. In yet another aspect, a method and apparatus of wireless communications increases the finger assignment rate only when a number of assignable multipath signals are greater than number of fingers available.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention.

In an exemplary embodiment of a communications system, a communications device can access a network, or communicate with other devices. The network can be a packet-based network, such as the Internet or a corporate Intranet, Public Switched Telephone Network (PSTN), or any other suitable network. An access network can be used to provide a wireless interface between the communications device and the network. An access network may take on various forms including, by way of example, one or more base stations in communication with a base station controller. The exemplary communications system can support various communications devices, including mobile or stationary subscriber stations.

A mobile station can also be called a subscriber station, subscriber unit, mobile, remote station, remote terminal, access terminal, user terminal, user agent, or user equipment. A mobile station may be a cellular telephone, cordless telephone, a computer or other processing device connected to a wireless modem, a Wireless Local Loop (WLL) station, or a Personal Digital Assistant (PDA) or handheld device having wireless connection capability. A mobile station may also be a Session Initiation Protocol (SIP) phone, cell phone, or computer.

Although various aspects of the present invention will be described in the context of a CDMA communications system, those skilled in the art will appreciate that the techniques for optimizing the searcher rate and the FAR described herein are likewise suitable for use in various other communications environments including communications systems based on TDMA, FDMA, SDMA, PDMA, and other modulation techniques known in the art, and communications systems based on standards including AMPS, GSM, HDR, and various CDMA standards, and other communication standards known in the art. Accordingly, any reference to a CDMA communications system is intended only to illustrate the inventive aspects of the present invention, with the understanding that such inventive aspects have a wide range of applications.

In a CDMA cellular telephone system, a common frequency band is used for communication with all base stations in a system. The common frequency band allows simultaneously communication between a mobile station and more than one base station. Signals occupying the common frequency band are discriminated at the receiving station through the spread spectrum CDMA waveform properties based on the use of a high speed pseudonoise (PN) code. The high speed PseudoNoise PN code is used to modulate signals transmitted from the base stations and the mobile stations. Transmitter stations using different PN codes or PN codes that are offset in time produce signals that can be separately received at the receiving station. The high speed PN modulation also allows the receiving station to receive a signal from a single transmitting station where the signal has traveled over several distinct propagation paths.

A signal having traveled several distinct propagation paths is generated by the multipath characteristics of the cellular channel. One characteristic of a multipath channel is the time spread introduced in a signal that is transmitted through the channel. For example, if an ideal impulse is transmitted over a multipath channel, the received signal appears as a stream of pulses. Another characteristic of the multipath channel is that each path through the channel may cause a different attenuation factor. For example, if an ideal impulse is transmitted over a multipath channel, each pulse of the received stream of pulses generally has different signal strength than other received pulses. Yet another characteristic of the multipath channel is that each path through the channel may cause a different phase on the signal. For example, if an ideal impulse is transmitted over a multipath channel, each pulse of the received stream of pulses generally has a different phase than other received pulses.

In the mobile radio channel, the multipath is created by reflection of the signal from obstacles in the environment, such as buildings, trees, cars, and people. In general the mobile radio channel is a time varying multipath channel due to the relative motion of the structures that create the multipath. For example, if an ideal impulse is transmitted over the time varying multipath channel, the received stream of pulses would change in time location, attenuation, and phase as a function of the time that the ideal impulse was transmitted.

The multipath characteristics of a channel can affect the signal received by the mobile station and result in, among other things, fading of the signal. Fading is the result of the phasing characteristics of the multipath channel. A fade occurs when multipath vectors add destructively, yielding a received signal that is smaller in amplitude than either individual vector. For example if a sine wave is transmitted through a multipath channel having two paths where the first path has an attenuation factor of X dB, a time delay of δ with a phase shift of Θ radians, and the second path has an attenuation factor of X dB, a time delay of δ with a phase shift of Θ+π radians, no signal is received at the output of the channel because the two signals, being equal amplitude and opposite phase, cancel each other. Thus, fading may have a severe negative effect on the performance of a wireless communications system.

The signal incident at a receiver antenna is the sum of all the multipath signals that are the result of the scattering and reflections of the signal from the transmitter to the receiver. The composite received signal can be modeled as having two components.

The first component is termed shadowing, slow fading, lognormal fading, or long-term fading. Slow fading results from the terrain contour between the transmitter and the receiver or as a result of the receiver passing through a tunnel, under a bridge, or behind a building. The received power measured at any particular location varies in time due to the effects of slow fading. The measured receive power due to the slow fading component is lognormally distributed.

The second signal component is termed fast fading, multipath fading, short-term fading, or Rayleigh fading. Fast fading results from the reflection and scattering of the transmitted signal by obstacles in the transmit path such as trees, buildings, vehicles, and other structures. Fast fading results in a fade of the entire receive bandwidth where signals arriving at the receiver combine destructively.

The signal incident at the receiver is composed of the fast fading signal superimposed on the slow fading signal. As a result, a radio receiver may experience tremendous variations in received signal strength. Additionally, a receiver experiences a frequency shift in the received signal. One contributor to a frequency shift is a Doppler shift that causes a receive signal frequency offset proportional to the speed of the receiver relative to the transmitter.

In narrow band modulation systems such as the analog Frequency Modulation (FM) modulation employed by conventional radio telephone systems, the existence of multiple path in the radio channel results in severe multipath fading. Different paths may be discriminated in a demodulation process, which reduces the severity of multipath fading.

The existence of multipath can provide path diversity to a wideband spread spectrum system. A spread spectrum system generates a spread information signal by modulating an information signal with a PN code. Generally the PN code runs at many times the rate of the information signal. The rate that the PN code is generated is called the chip rate and the duration of one data bit of the PN code is called the chip time. If two or more paths are available with greater than chip time differential path delay, two or more processing elements, called demodulation elements, can be employed to separately demodulate these signals. These signals typically exhibit independence in multipath fading, i.e., they do not usually fade together. Therefore the output of the two or more demodulation elements can be combined to obtain path diversity. A loss of signal occurs only when the signals from all demodulation elements experience a fade at the same time. In an ideal system, both the base station and the mobile station employ multiple demodulation elements. Demodulation elements are also called fingers.

As a mobile station moves through the physical environment, the number of signal paths and the strength of the signals on these paths vary constantly, both as received at the mobile station and as received at the base station. Therefore, a receiver in an embodiment uses a special processing element called a searcher element, that continually scans the channel in the time domain to determine the existence, time offset, and the signal strength of signals in the multiple path environment. A searcher element is also called a search engine. The output of the searcher element provides the information for ensuring that the demodulation elements are tracking the most advantageous paths.

An embodiment provides a method of assigning the multiple demodulation elements to the multiple received signals based on the searcher element information. A method and system for assigning demodulation elements to a set of available signals for both mobile stations and base stations is disclosed in U.S. Pat. No. 5,490,165 entitled "DEMODULATION ELEMENT ASSIGNMENT IN A SYSTEM CAPABLE OF RECEIVING MULTIPLE SIGNALS," issued Feb. 6, 1996, and assigned to the Assignee of the present invention.

Figure 2:
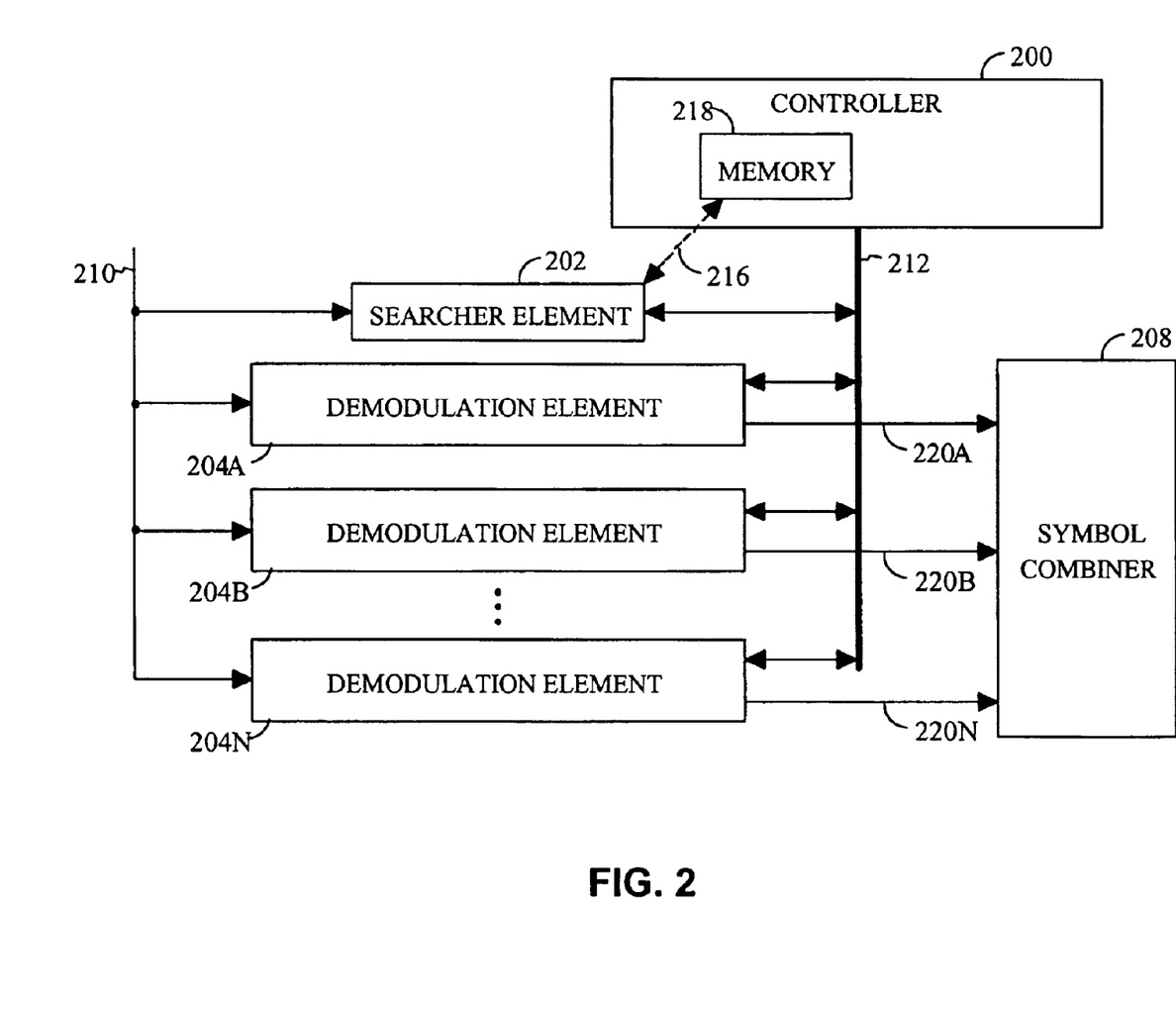
FIG. 2 illustrates an exemplary embodiment of a mobile station comprising multiple independent demodulation elements.

The method used by the mobile station assumes that the mobile station comprises multiple independent demodulation elements. FIG. 2 illustrates an exemplary embodiment of such a mobile station. The elements are controlled by controller 200 through interconnection 212. Input signal 210 supplies the signal received by the mobile station that has been Radio Frequency (RF)/analog processed to searcher element 202 and demodulation elements 204A–204N. Searcher element 202 continually scans the time domain searching for pilot signals from nearby base stations. Searcher element 202 also scans a set of time offsets around the nominal arrival of the signal from each base station in search of multipath signals that have developed.

Searcher rate is defined as the number of searches a searcher element performs per second. Searcher rate is the rate at which a searcher element scans the time domain and scans a set of time offsets.

Searcher element 202 passes the developed data to controller 200. Searcher element 202 may pass data through interconnection 202. Alternatively, searcher element 212 may pass data to controller 200 through direct memory access. Direct memory access allows searcher element 202 to pass information directly to controller memory 218 without interrupting controller functions. Direct memory access operation is illustrated by dashed data line 216 that is directly connected from searcher element 212 to memory 218 within controller 200. Controller 200 uses the data stored in memory 218 to assign demodulation elements 204A–204N to one of the plurality of information signals that may be contained in input signal 210.

Demodulation elements 204A–204N process input signal 210 to produce soft decision data bits 220A–220N that are combined in symbol combiner 208. The output of symbol combiner 208 (not shown) is aggregate soft decision data suitable for Viterbi decoding. Demodulation elements 204A–204N also provide several output control signals to controller 200 through interconnection 212 that are used in the assignment process. Each of demodulation elements 204A–204N is highly similar in structure to the others.

A microprocessor is used to assign demodulation elements to available multipath signal instances. Each demodulation element is also called a finger. Therefore, the rate at which the microprocessor assigns demodulation elements to available multipath instances is called the finger assignment rate (FAR). A finger assignment algorithm for high data rate calls is disclosed in U.S. patent application Ser. No. 09/398,907 entitled "MODIFIED FINGER ASSIGNMENT ALGORITHM FOR HIGH DATA RATE CALLS," filed Sep. 15, 1999, and assigned to the Assignee of the present invention.

A searcher element is used to provide data to the microprocessor concerning the multipath components of the received signal. The searcher element measures the arrival time and amplitude of the multipath components of a pilot signal transmitted by the base stations. The effect of the multipath environment is the same on the pilot signal and the data signal. Determining the multipath environment's effect on the pilot signal allows the microprocessor to assign demodulation elements to data channel multipath signal instances.

The searcher element determines the multipath components of the pilot signal by "searching" through a sequence of potential path offsets and measuring the energy of the pilot signal received at each of the potential path offsets. The microprocessor evaluates the energy associated with a potential offset, and, if it exceeds a certain threshold, assigns a signal demodulation element to that offset. A method and apparatus of demodulation element assignment based on searcher energy levels is disclosed in U.S. Pat. No. 5,490,165 entitled "DEMODULATION ELEMENT ASSIGNMENT IN A SYSTEM CAPABLE OF RECEIVING MULTIPLE SIGNALS" assigned to the assignee of the present invention.

Figure 3:
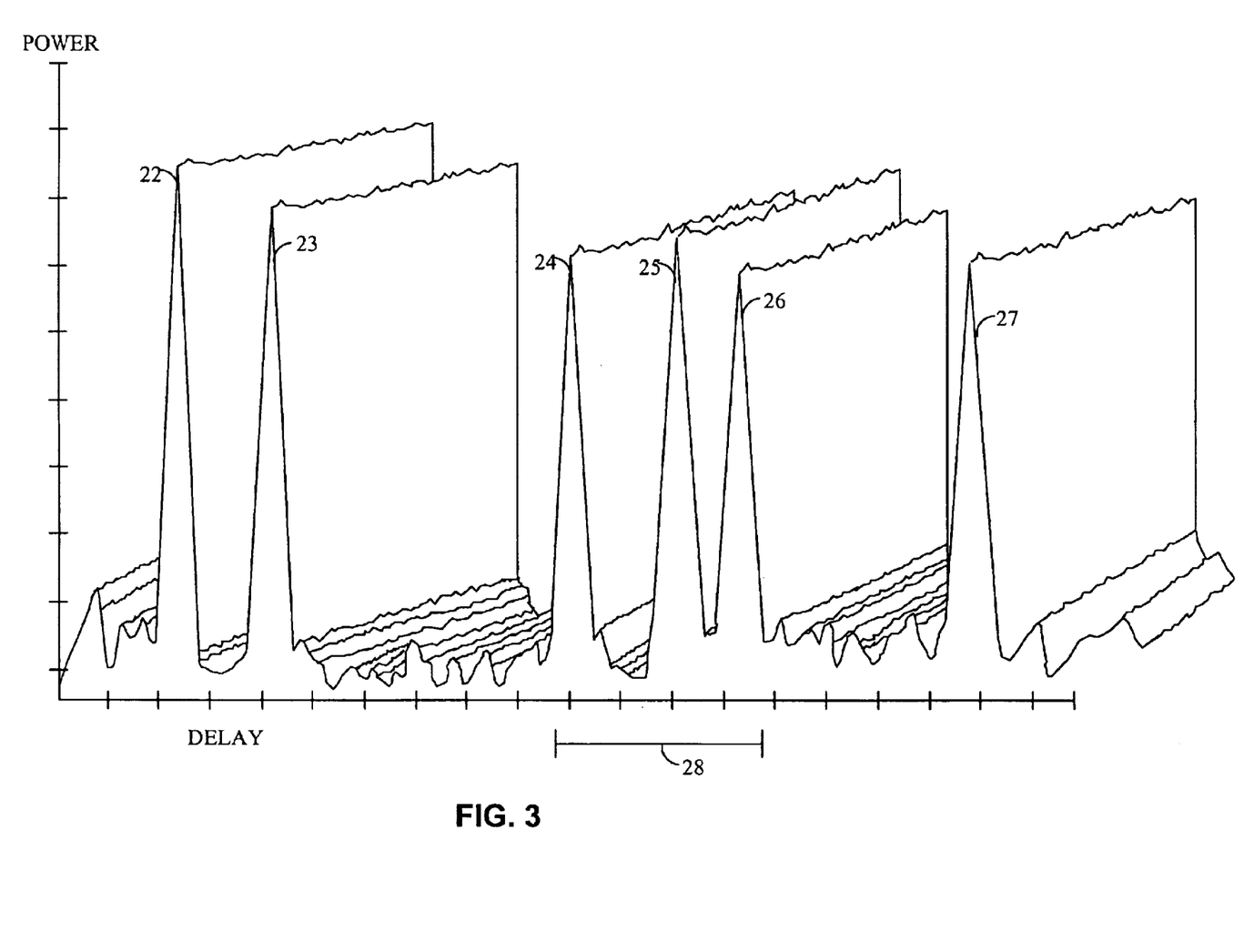
FIG. 3 shows an exemplary set of multipath signal instances of a single pilot signal from a base station arriving at a mobile station.

FIG. 3 shows an exemplary set of multipath signal instances of a single pilot signal from a base station arriving at a mobile station. The vertical axis represents the power received in decibels (dB). The horizontal axis represents the delay in the arrival time of a signal instance due to multipath delays. The axis (not shown) going into the page represents a segment of time. Each signal spike in the common plane of the page has arrived at the mobile station at a common time but has been transmitted by the base station at a different time. Each signal spike 22–27 has traveled a different path and therefore exhibits a different time delay, different amplitude, and a different phase response. The six different signal spikes represented by spikes 22–27 are representative of a severe multipath environment. Typical urban environment produces fewer usable paths. The noise floor of the system is represented by the peaks and dips having lower energy levels. The task of the search engine is to identify the delay, as measured by the horizontal axis, and amplitude, as measured by the vertical axis, of signal spikes 22–27 for potential demodulation element assignment.

Note, as shown in FIG. 3, each of the multipath peaks varies in amplitude as a function of time as shown by the uneven ridge of each multipath peak. In the limited time shown, there are no major changes in the multipath peaks. Over a more extended time range, multipath peaks disappear and new paths are created as time progresses. Multipath peaks are likely to merge together or blur into a wide peak over time. The system microprocessor steps the search engine through a set of offsets, called a search window, that is likely to contain one or more multipath signal peaks suitable for assignment to a demodulation element. For each offset, the search engine reports the energy it found at that offset back to microprocessor. Demodulation elements may then be assigned by microprocessor to the paths identified by the search engine (i.e. the timing reference of their PN generators is moved to align it to that of the found path). Once a demodulation element has locked onto the signal at its assigned offset, it then tracks that path on its own without microprocessor supervision, until the path fades away or until the demodulation element is assigned to another path by the microprocessor.

Each of the multiple base stations transmits a pilot signal having a common PN sequence. Each base station transmits the pilot signal offset in time from neighboring base stations so that the signals can be distinguished from one another at the mobile station. At any given time, the mobile station may receive a variety of signals from multiple base stations. Using a copy of the PN sequence, which is generated at the mobile station, the entire PN space can be searched by the mobile station. Using the search results, the microprocessor distinguishes the multiple base stations based on the time offset.

Figure 4:
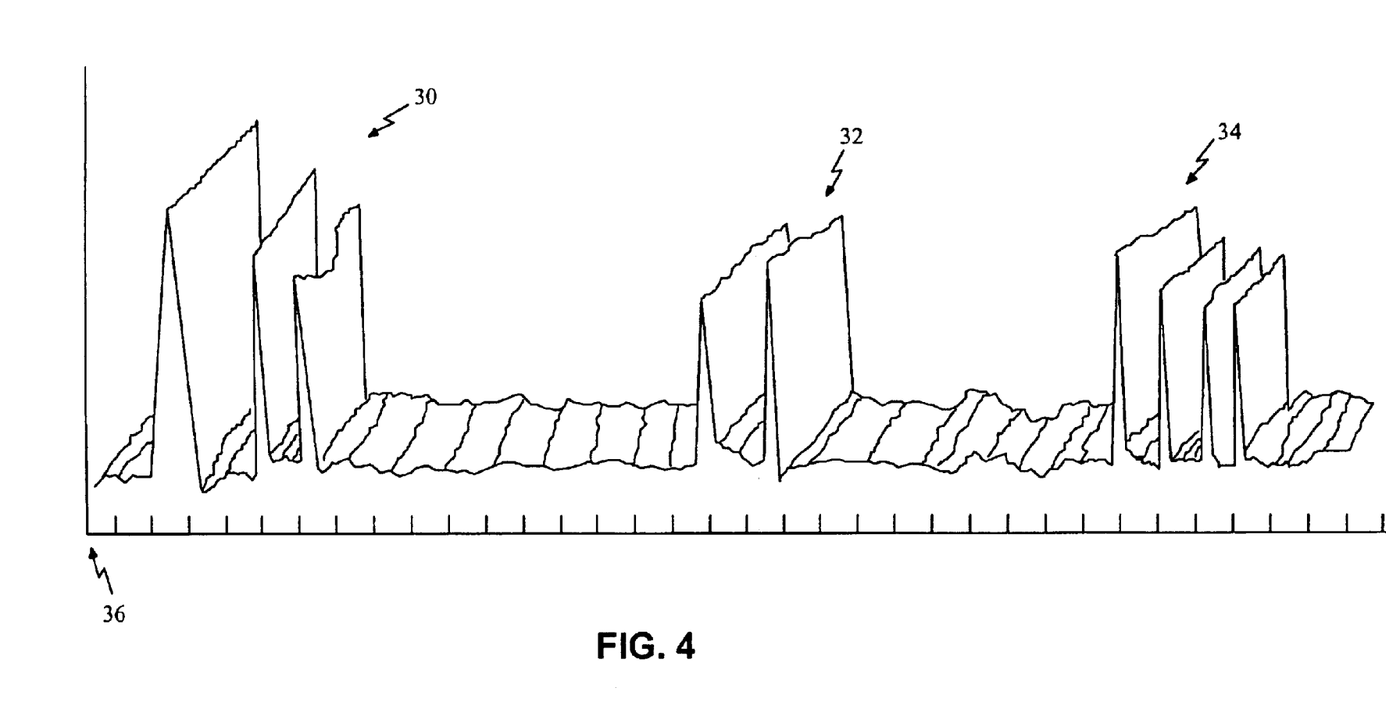
FIG. 4 shows an extended portion of PN space on the horizontal axis.

FIG. 4 shows an extended portion of PN space on the horizontal axis. The groups of peaks 30, 32 and 34 represent transmissions from three different base stations. As is seen, the signal from each base station signal experiences a different multipath environment. Also, each base station has a different PN offset from the PN reference 36. Thus, the microprocessor may select a set of PN offsets corresponding to a search window for any of the identified base stations. This allows the mobile station to simultaneously demodulate signals from multiple base stations by assigning demodulation elements appropriately.

The multipath environment is constantly changing as the mobile station moves about in the base station coverage area. The number of searches that must be performed is set by the need to find multipath quickly enough so that the path may be put to good use by the demodulation elements. As the multipath environment changes, the search engine must complete searches quickly to support demodulation element assignment.

Figure 5:
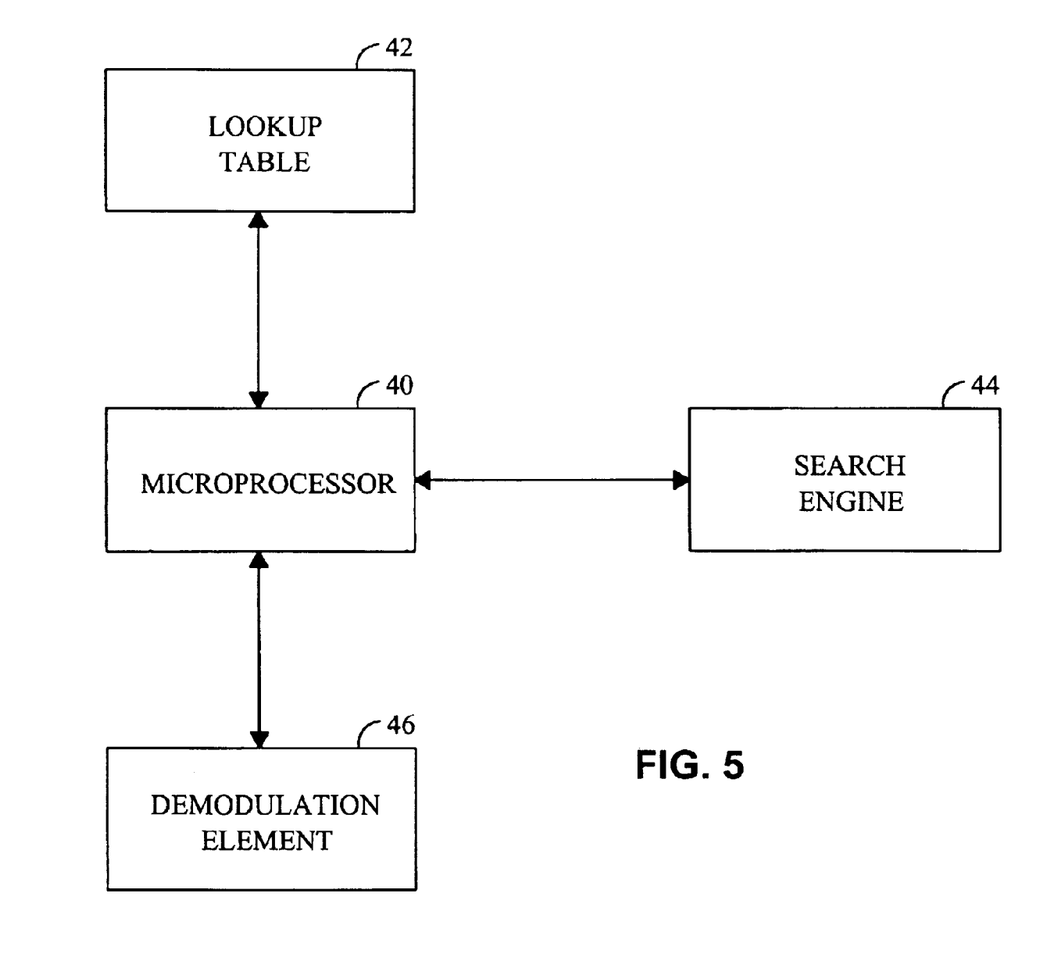
FIG. 5 shows a block diagram of microprocessor, demodulation element, searcher element, and lookup table used in an exemplary embodiment.

One embodiment of a searching process is described in relation to FIG. 5. At the beginning of the search process, a microprocessor 40 determines the desired initial PN offset for the search window and the desired search window size, such as, for example, according to well-known techniques for signal searching. Following this determination the microprocessor 40, using the search window size as an index, retrieves search parameters from a lookup table 42. The search parameters comprise an integration interval and a number of non-coherent passes. The integration interval determines the period, which the search engine "dwells" at each PN offset within the search window, integrating the signal energy, as the search engine steps through the search window. The number of non-coherent passes defines the number of times the search engine steps through the PN offsets designated by the search window. Because the integration interval and number of non-coherent passes affect the amount of time required to process a complete search, the duration of a search can be controlled by selection of these parameters. In general, a longer integration interval produces a better signal to noise ratio. However, as described above, if the multipath environment produces a fade, as a result of multipath vectors adding destructively, a longer integration interval may not improve the signal to noise ratio. Search results may improve through an increase in the number of non-coherent passes because the multipath environment may change between passes allowing detection of a multipath instance which is faded on an initial pass to be detected during a subsequent pass in the same search.

A method and apparatus for dynamic control of the search process is disclosed in U.S. Pat. No. 6,320,849 B1 entitled "DYNAMIC CONTROL OF SEARCH DURATION IN A WIRELESS COMMUNICATION DEVICE" assigned to the assignee of the present invention.

Path diversity combining in the mobile station significantly advances the quality and reliability of communications in a cellular telephone system. A form of maximal ratio combining may be used to increase the benefit in which a signal-to-noise ratio is determined for each path. Each path may then be combined with the contributions from the other paths weighted according to the signal-to-noise ratio. Combining may be coherent because pilot signal demodulation allows the phase of each path to be determined.

In the path from the mobile station to the base station, path diversity reception is obtained in a similar manner. A base station may contain an analogous set of processing elements as the mobile station in that a searcher element may provide data to assign a plurality of demodulation elements.

During communication with an end user, the demodulated data signals of a base stations are forwarded to a cellular system controller along with an indication of signal quality. The cellular system controller relays these signals to the end user. When a mobile station is in a base station diversity mode with two independent base stations, the demodulated data signals of both base stations are forwarded to the cellular system controller along with an indication of signal quality. The cellular system controller then combines the two versions of the mobile station signal or selects the signal with the best quality indication. An alternative system configuration may transmit the undecoded or even the undemodulated signals to the cellular system controller to allow a better diversity combining process to be used.

Figure 6:
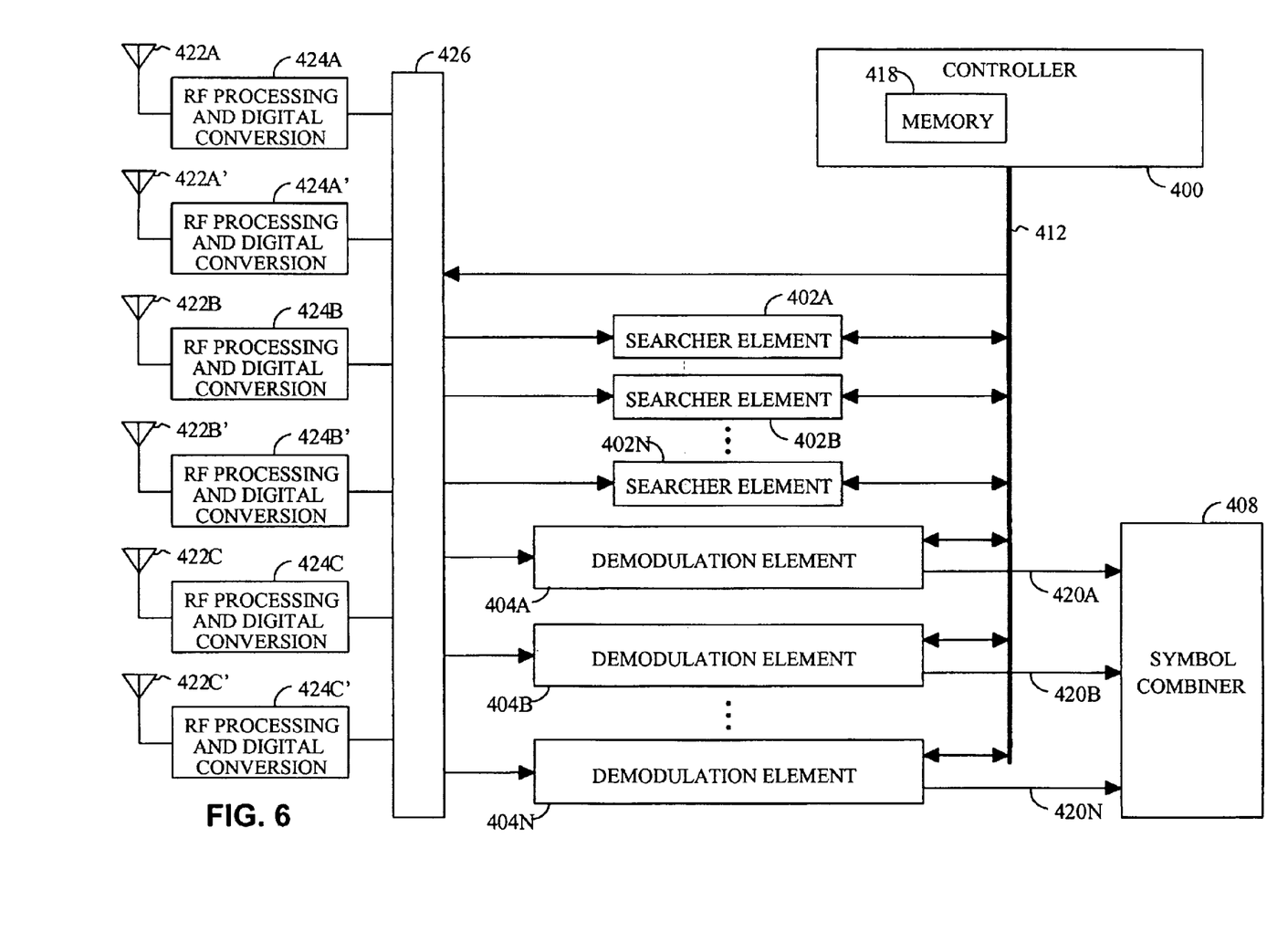
FIG. 6 illustrates an exemplary embodiment of a base station with diversity antennas.

FIG. 6 illustrates an embodiment of such a base station. FIG. 6 represents a three-sectored base station where each of antennas 422A–422C is the antenna for one sector. Each of antennas 422A'–422C' corresponds to one of antennas 422A–422C and is a diversity antenna for the sector corresponding to the like numbered antenna. Each of antennas 422A–422C covers the same coverage area as the corresponding antenna of antennas 422A'–422C'. In a typical base station, antennas 422A–422C have overlapping coverage areas that subdivide the base station into three sectors where each antenna covers more than one third of the total aggregate coverage area of the base station. Therefore a signal from a single mobile station may be present at more than one antenna at a time. The number of sectors and the number of antennas assigned to each sector may vary. Variations of this type do not effect the general principles of the present invention.

Antennas 422A, 422B, 422C, 422A', 422B', and 422C' supply the received signal to RF processing and digital conversions 424A, 424B, 424C, 424A', 424B', and 424C' respectively. RF processing and digital conversions 424A, 424B, 424C, 424A', 424B', and 424C' process the RF signal and convert the signal to digital bits. RF processing and digital conversions 424A, 424B, 424C, 424A', 424B', and 424C' filter the digital bits and provide the resulting digital bits to interface port 426. Interface port 426 may connect any of the six incoming signal paths to any of the searcher elements or demodulation elements under the control of controller 400 through interconnection 412.

The searcher and demodulation elements are also controlled by controller 400 through interconnection 412. Searcher elements 402A–402N continually scan a time domain window in search of a particular mobile station's information signal as controlled by system controller 400. Searcher elements 402A–402N also scan a set of time offsets around the nominal arrival of the signal in search of multipath signals that have developed.

Searcher elements 402A–402N pass the developed data to controller 400 for storage in memory 418. Searcher elements 402A–402N may pass data through a standard bus or searcher elements 402A–402N may pass data to memory 418 through direct memory access (not shown) as discussed previously in reference to FIG. 2. Controller 400 uses the data stored in memory 418 to assign demodulation elements 404A–404N to one of the plurality of information signals from a single mobile.

In this exemplary embodiment, to maintain a high system capacity, each mobile station in the system does not continually transmit a pilot signal. The lack of a pilot signal on the reverse link increases the time needed to conduct with a single searcher element a survey of all possible time offsets at which a mobile station signal may be received. Therefore, to provide a rapid searching process, more than one searcher element is used to conduct a full search. Each of searcher elements 402A–402N is assigned by the controller to search a set of time offsets. Each of searcher elements 402A–402N supplies back to controller 400 the results of the search it performs. Controller 400 tabulates these results for use in the assignment method.

Demodulation elements 404A–404N produce data bits 420A–420N that are combined in symbol combiner 408. The output of symbol combiner 408 (not shown) is aggregate soft decision data suitable for Viterbi decoding. Notice that symbol combiner 408 can combine signals from just one sector to produce an output or it can combine symbols from multiple sectors as selected by the interface port 426. When symbol combiner 408 is combining signals from a mobile station that is communicating through more than one sector, this state is referred to as softer handoff. The base station may send the output of symbol combiner 408 to a cellular system controller where symbols from a common mobile station also combine with signals from other base stations to produce a single output. This process is referred to as soft handoff. Demodulation elements 404A–404N also provide several output control signals to controller 400 through interconnection 412 that are used in the assignment process. Each of demodulation elements 404A–404N is highly similar in structure to the others.

In an embodiment, a mobile station includes a diversity antenna and can have the same structure as shown in FIG. 6 for a base station. It will be apparent to those skilled in the art that a mobile station and a base station may have any number of diversity antennas and would have structure corresponding to the diversity antennas.

FIG. 2 and FIG. 6 may be any receiving device that needs to combine multipath signals from a transmitting device.

The searcher rate has a direct relationship with the frequency of getting good peaks from a searcher element and locking the peaks with finger assignment. If the searcher rate is slow, then the rate of finger assignment is slow, which implies that the frequency of obtaining good peaks decreases, which may lead to a poor handoff or dropping a call. If the searcher rate is increased, then the rate of finger assignment may be increased, which implies that the frequency of obtaining good peaks increases, which may lead to an improved handoff.

An embodiment solves the problem of figuring out the searcher rate and the finger assignment rate for a varying fading condition. The relative difference in velocity between the transmitting device and the receiving device, also called relative velocity, is used as a proxy for detecting a fading condition that requires an increased signal gain. The searcher rate and the finger assignment rate are dynamically increased when the relative velocity is slow. The searcher rate and the finger assignment rate are increased in order to gain CDMA network capacity. The searcher rate and the finger assignment rate are set back to their default values when the relative velocity is no longer slow. Decreasing the searcher rate and finger assignment rate by setting them back to their default values decreases processor utilization in the receiving device and thereby increases the battery life of the receiving device in the case where the receiving device runs off of a battery and decreases consumption of power to run the receiving device.

Figure 7:
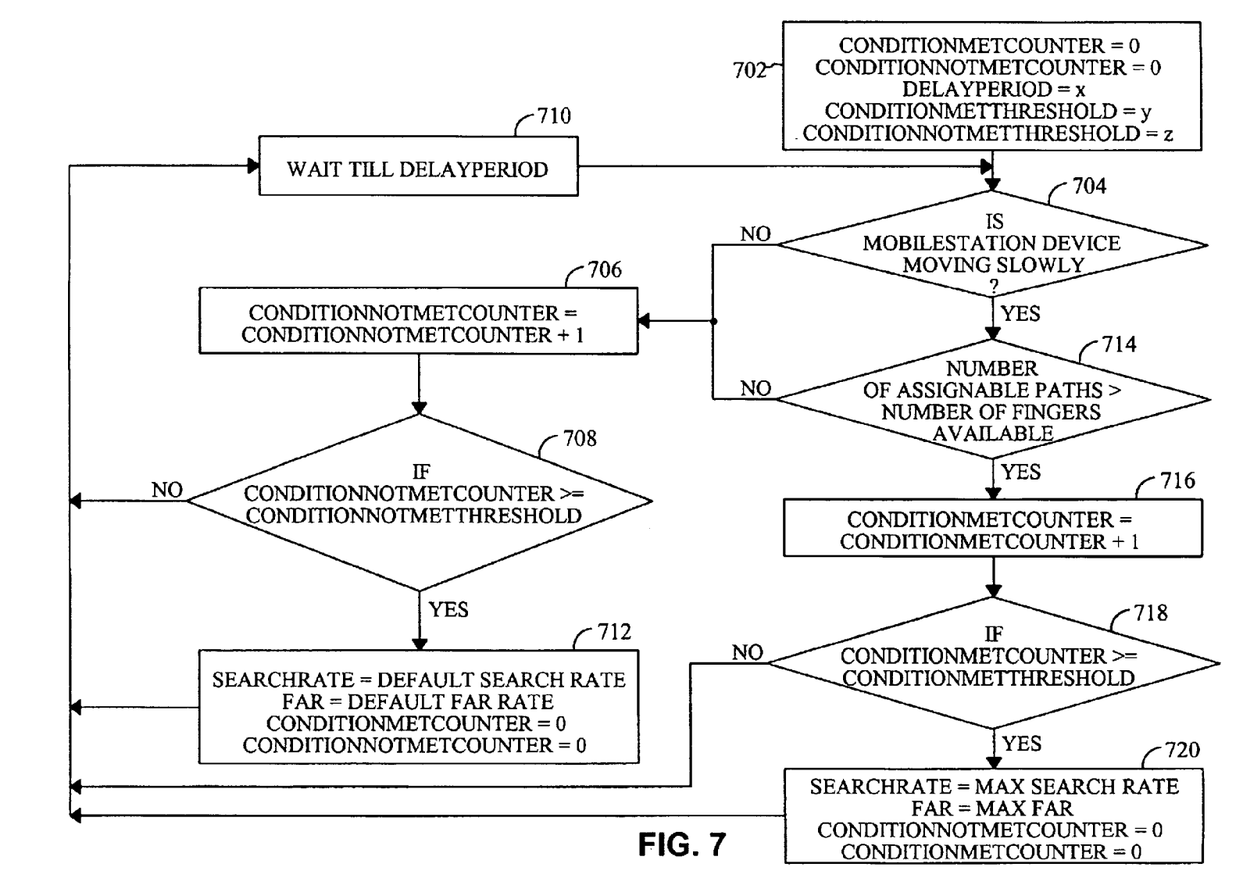
FIG. 7 is flowchart of a search rate and finger assignment rate algorithm of an exemplary embodiment.

FIG. 7 is flowchart of a search rate and finger assignment rate algorithm of an exemplary embodiment. In step 702, counters and threshold values are initialized. ConditionMetCounter and ConditionNotMetCounter are initialized to zero. ConditionMetThreshold is initialized to a threshold value y. ConditionNotMetThreshold is initialized to a threshold value z. It would be apparent to those skilled in the art that the threshold values are implementation specific. The ConditionMetCounter and the ConditionNotMetCounter smoothes the results of the algorithm in the case where a condition is ping-ponging between meeting the condition and not meeting the condition. The condition determines whether the search rate and the FAR are set to their maximum rates.

In step 704, a test is made to determine whether the mobile station is moving slowly. In an exemplary embodiment, the mobile station is moving slowly when it is traveling at less than or equal to 10 kilometers per hour. An apparatus and method for estimating the velocity of a mobile station is disclosed in U.S. patent application Ser. No. 09/776,128 entitled "APPARATUS AND METHOD OF VELOCITY ESTIMATION," filed Feb. 1, 2001, now U.S. Pat. No. 6,529,850, issued Mar. 4, 2003, and assigned to the Assignee of the present invention.

If the mobile station is not moving slowly, then in step 706, the ConditionNotMetCounter is incremented. After step 706, the flow of control goes to step 708. In step 708, a test is made to determine whether the ConditionNotMetCounter is greater than or equal to the ConditionNotMetThreshold. If in step 708 the ConditionNotMetCounter is not greater than or equal to the ConditionNotMetThreshold, then the flow of control goes to step 710. In step 710, there is a wait period (also called a delay period) before the flow of control goes to step 704 and another iteration of the algorithm occurs. If in step 708 the ConditionNotMetCounter is greater than or equal to the ConditionNotMetThreshold, then the flow of control goes to step 712.

In step 712, a default searcher rate and a default FAR are used. SearchRate is set to Default Search Rate. FAR is set to the Default FAR. In an exemplary embodiment, the default searcher rate is 100 searches per second, and the FAR is 100 fingers assigned per second. In another embodiment, the FAR is less than the searcher rate because it may take more time to assign fingers than it takes for a searcher element to provide information to a searcher element. ConditionMetCounter and the ConditionNotMetCounter are both reset to zero. The flow of control goes to step 710 after step 712.

If in step 704 the mobile station is moving slowly, then in step 714, a test is made to determine whether the number of assignable multipaths is greater than the number of fingers available. A multipath is assignable if it has reached a signal threshold indicating that the multipath is capable of being assigned a demodulation element. If the number of assignable multipaths is not greater than the number of fingers available, then the flow of control goes to step 706, and the ConditionNotMetCounter is incremented. If the number of assignable multipaths is greater than the number of fingers available, then in step 716, the flow of control goes to step 716 and the ConditionMetCounter is incremented.

In step 718, a test is made to determine whether the ConditionMetCounter is greater than or equal to the ConditionMetThreshold. If the ConditionMetCounter is not greater than or equal to the ConditionMetThreshold, then the flow of control goes to step 710. If the ConditionMetCounter is greater than or equal to the ConditionMetThreshold, then the flow of control goes to step 720. In step 720, the maximum searcher rate and the maximum FAR are used. Search Rate is set to the Max Search Rate. FAR is set to Max FAR. In an exemplary embodiment, the maximum searcher rate is 170 searches per second and the maximum FAR is 170 searches per second. ConditionNotMetCounter and ConditionMetCounter are reset to zero. After step 720, the flow of control goes to step 710.

When the search rate and finger assignment rate algorithm is executed in a base station, the search rate and finger assignment rate refers to a particular mobile station. A base station communicates with a plurality of mobile stations. There is a searcher element and a number of demodulation elements within the base station per mobile station with which base station is communicating.

Those of skill in the art would understand that method steps could be interchanged without departing from the scope of the invention. Those of skill in the art would also understand that information and signals might be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks and modules described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM) memory, flash memory, Read-Only Memory (ROM), Erasable Programmable ROM (EPROM), registers, hard disk, a removable disk, a Compact Disc Read-Only Memory (CD-ROM), or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a subscriber station. In the alternative, the processor and the storage medium may reside as discrete components in a subscriber station.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of wireless communications, comprising:
   detecting when a mobile station is moving at a slow velocity; and
   increasing a searching rate only upon detecting when the mobile station is moving at a slow velocity.

2. The method of claim 1, further comprising increasing a finger assignment rate responsive to detecting when the mobile station is moving at a slow velocity.

3. The method of claim 1, wherein the searching rate is increased to the maximum searching rate.

4. The method of claim 2, wherein the finger assignment rate is increased to the maximum finger assignment rate.

5. The method of claim 1, wherein the searching rate is increased only when a number of assignable multipath signals is greater than the number of fingers available.

6. The method of claim 2, wherein the finger assignment rate is increased only when a number of assignable multipath signals is greater than the number of fingers available.

7. The method of claim 1, further comprising:
   detecting when a mobile station is no longer moving at a slow velocity; and
   decreasing the searching rate responsive to detecting when the mobile station is no longer moving at a slow velocity.

8. The method of claim 2, further comprising decreasing a finger assignment rate responsive to detecting when the mobile station is no longer moving at a slow velocity.

9. A wireless communications system, comprising:
   means for detecting when the mobile station is moving at a slow velocity; and
   means for increasing a searching rate only upon detecting when the mobile station is moving at a slow velocity.

10. The wireless communications system of claim 9, further comprising means for increasing a finger assignment rate responsive to detecting when the mobile station is moving at a slow velocity.

11. The wireless communications system of claim 9, wherein the searching rate is increased to the maximum searching rate.

12. The wireless communications system of claim 10, wherein the finger assignment rate is increased to the maximum finger assignment rate.

13. The wireless communications system of claim 9, wherein the searching rate is increased only when a number of assignable multipath signals is greater than the number of fingers available.

14. The wireless communications system of claim 10, wherein the searching rate is increased only when a number of assignable multipath signals is greater than the number of fingers available.

15. The wireless communications system of claim 9, wherein the searching rate is decreased when the mobile station is no longer moving at a slow velocity.

16. The wireless communications system of claim 10, wherein the finger assignment rate is decreased when the mobile station is no longer moving at a slow velocity.

\* \* \* \* \*